US012511437B1

(12) United States Patent
Tsao et al.

(10) Patent No.: US 12,511,437 B1
(45) Date of Patent: Dec. 30, 2025

(54) CHAT DETECTION AND RESPONSE FOR ENTERPRISE DATA SECURITY

(71) Applicant: Trend Micro Incorporated, Tokyo (JP)

(72) Inventors: Wen-Kwang Tsao, Taipei (TW); David Girard, Montreal (CA); Mun Hou Wong, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 119 days.

(21) Appl. No.: 18/410,316

(22) Filed: Jan. 11, 2024

Related U.S. Application Data

(60) Provisional application No. 63/450,562, filed on Mar. 7, 2023.

(51) Int. Cl.
  *G06F 21/62* (2013.01)
  *G06F 21/60* (2013.01)
  *G06F 40/205* (2020.01)

(52) U.S. Cl.
  CPC ........ *G06F 21/6263* (2013.01); *G06F 40/205* (2020.01); *G06F 21/60* (2013.01)

(58) Field of Classification Search
  CPC ..... G06F 21/6263; G06F 40/205; G06F 21/60
  USPC .......................................................... 726/22
  See application file for complete search history.

(56) References Cited

U.S. PATENT DOCUMENTS

| | | | | |
|---|---|---|---|---|
| 9,967,236 B1 * | 5/2018 | Ashley | ..................... | H04L 63/20 |
| 10,079,835 B1 * | 9/2018 | Dodke | ................ | H04L 63/0245 |
| 10,158,639 B1 * | 12/2018 | Goben | ..................... | H04L 63/10 |
| 11,956,245 B1 * | 4/2024 | Bhatt | ........................ | G06N 5/04 |
| 12,164,664 B1 * | 12/2024 | Dupont | .................. | H04L 9/3213 |
| 2014/0007222 A1 * | 1/2014 | Qureshi | .................. | H04L 67/10 726/16 |
| 2014/0026182 A1 * | 1/2014 | Pearl | ........................ | H04L 63/20 726/1 |
| 2017/0091482 A1 * | 3/2017 | Sarin | ........................ | G06F 21/55 |
| 2018/0121552 A1 * | 5/2018 | Bostick | ................ | G06F 21/6254 |
| 2020/0387629 A1 * | 12/2020 | Yang | ..................... | G10L 15/1822 |
| 2021/0035576 A1 * | 2/2021 | Kang | ...................... | G10L 15/22 |
| 2021/0126926 A1 * | 4/2021 | Kaidi | .................... | G06F 21/606 |
| 2021/0240836 A1 * | 8/2021 | Hazony | .................. | G06F 21/577 |
| 2022/0100902 A1 * | 3/2022 | Juniper | ............... | H04L 63/0281 |
| 2022/0150280 A1 * | 5/2022 | Azulay | ............... | H04L 63/0428 |
| 2022/0188413 A1 * | 6/2022 | Singh | .................... | G06F 21/629 |
| 2022/0198055 A1 * | 6/2022 | Deshmukh | ............ | G06F 16/137 |

(Continued)

OTHER PUBLICATIONS

Manes et al, Packet Sniffing for Automated Chat Room Monitoring and Evidence Preservation, pp. 285-288, 2001 (Year: 2001).*

(Continued)

*Primary Examiner* — Thanh T Le
(74) *Attorney, Agent, or Firm* — Beyer Law Group LLP

(57) ABSTRACT

A system for preventing submission of sensitive information of an enterprise to a generative artificial intelligence (AI) chatbot includes an endpoint computer and a backend system. A user of the enterprise employs the endpoint computer to chat with the generative AI chatbot. The chat is monitored on the endpoint computer, and a record of the chat is provided to the backend system over the public Internet. In the backend system, the record of the chat is parsed to identify the enterprise's sensitive information, enabling the facilitation of corresponding security management responses and actions.

9 Claims, 4 Drawing Sheets

(56) References Cited

U.S. PATENT DOCUMENTS

| | | | | |
|---|---|---|---|---|
| 2022/0382789 | A1* | 12/2022 | Gupta | G06F 16/35 |
| 2023/0169135 | A1* | 6/2023 | Panikkar | H04L 63/168 |
| | | | | 726/2 |
| 2023/0169963 | A1* | 6/2023 | Sharifi | G06F 3/167 |
| | | | | 704/255 |
| 2024/0143778 | A1* | 5/2024 | Berkowitz | G06F 21/577 |
| 2024/0160782 | A1* | 5/2024 | Thomas | G06F 21/6245 |
| 2024/0241982 | A1* | 7/2024 | Gordon | G06F 21/6227 |
| 2024/0303357 | A1* | 9/2024 | Al-Essa | G06F 21/6218 |
| 2025/0190475 | A1* | 6/2025 | Siebel | G06F 16/334 |

OTHER PUBLICATIONS

"What is Generative AI Chatbot? Everything You Need to Know in 2023", Chatbot.team, LinkedIn, Sep. 28, 2023, Downloaded January 4, 2024, http://www.linkedin.com/pulse/what-generative-ai-chatbot-everything-you-need-know-2023/.

"Chat Basics", Twitch, Downloaded Jan. 3, 2024, http://help.twitch.tv/s/article/chat•basics?language=en_US.

"ChatGPT", Wikipedia, Downloaded Jan. 3, 2024, https://en.wikipedia.org/wiki/ChatGPT.

"Data Lake", Wikipedia, Downloaded Jan. 3, 2024, https://en.wikipedia.org/wiki/Data_lake.

"OpenAI", Wikipedia, Downloaded Jan. 3, 2024, https://en.wikipedia.org/wiki/OpenAI#:~:text=The.

"Chat Filtering Now Available on Steam: Obscure the Most Commonly Used Strong Profanity and Slurs with Chat Filtering", Steam, Oct. 6, 2020, Downloaded Jan. 4, 2024, https://store.steampowered.com/news/app/593110/view/2855803154584367415.

"Attack Surface Discovery", Trend Micro Online Help Center, Downloaded Jan. 4, 2024, https://www.docs.trendmicro.com/en-us/enterprise/trend-vision-one-olh/security-posture-gro/attacksurfacediscove.aspx.

"Twitch Chat Filter", Chrome Web Store, Downloaded Jan. 3, 2024, https://chromewebstore.google.com/detail/twitch-chat-filter/edldhcedhipciodaefichchenblabceh?pli=1.

"Wordfilter", Wikipedia, Downloaded Jan. 3, 2024, https://en.wikipedia.org/wiki/Wordfilter.

* cited by examiner

CHAT DETECTION AND RESPONSE FOR ENTERPRISE DATA SECURITY

CROSS-REFERENCE TO RELATED APPLICATION

This application claims the benefit of U.S. Provisional Application No. 63/450,562, filed on Mar. 7, 2023, which is incorporated herein by reference in its entirety.

TECHNICAL FIELD

The present disclosure is directed to cybersecurity.

BACKGROUND

Generative artificial intelligence (AI) chatbots, such as the ChatGPT chatbot, have become an essential tool of users in enterprise environments. Generative AI chatbots ("chatbots") are used in enterprises to write code, create plans, answer basic questions, etc. While chatbots are undeniably useful in the workplace, employees may inadvertently disclose sensitive information of the enterprise while chatting with a chatbot.

BRIEF SUMMARY

In one embodiment, a method of preventing submission of sensitive information of an enterprise to a generative artificial intelligence (AI) chatbot includes monitoring, on an endpoint computer, a chat between a user of a plurality of users of the enterprise and the generative AI chatbot. A record of the chat is provided from the endpoint computer to a backend system over the public Internet. The record of the chat is parsed to identify sensitive information of the enterprise. A response action is performed in response to identifying sensitive information of the enterprise in the chat.

In another embodiment, a system for preventing submission of sensitive information of an enterprise to a generative AI chatbot includes an endpoint computer and a backend system. The endpoint computer is employed by a user to chat with the generative AI chatbot over the public Internet. The backend system is configured to receive a record of the chat from the endpoint computer over the public Internet, and parse the record of the chat to identify sensitive information of the enterprise.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
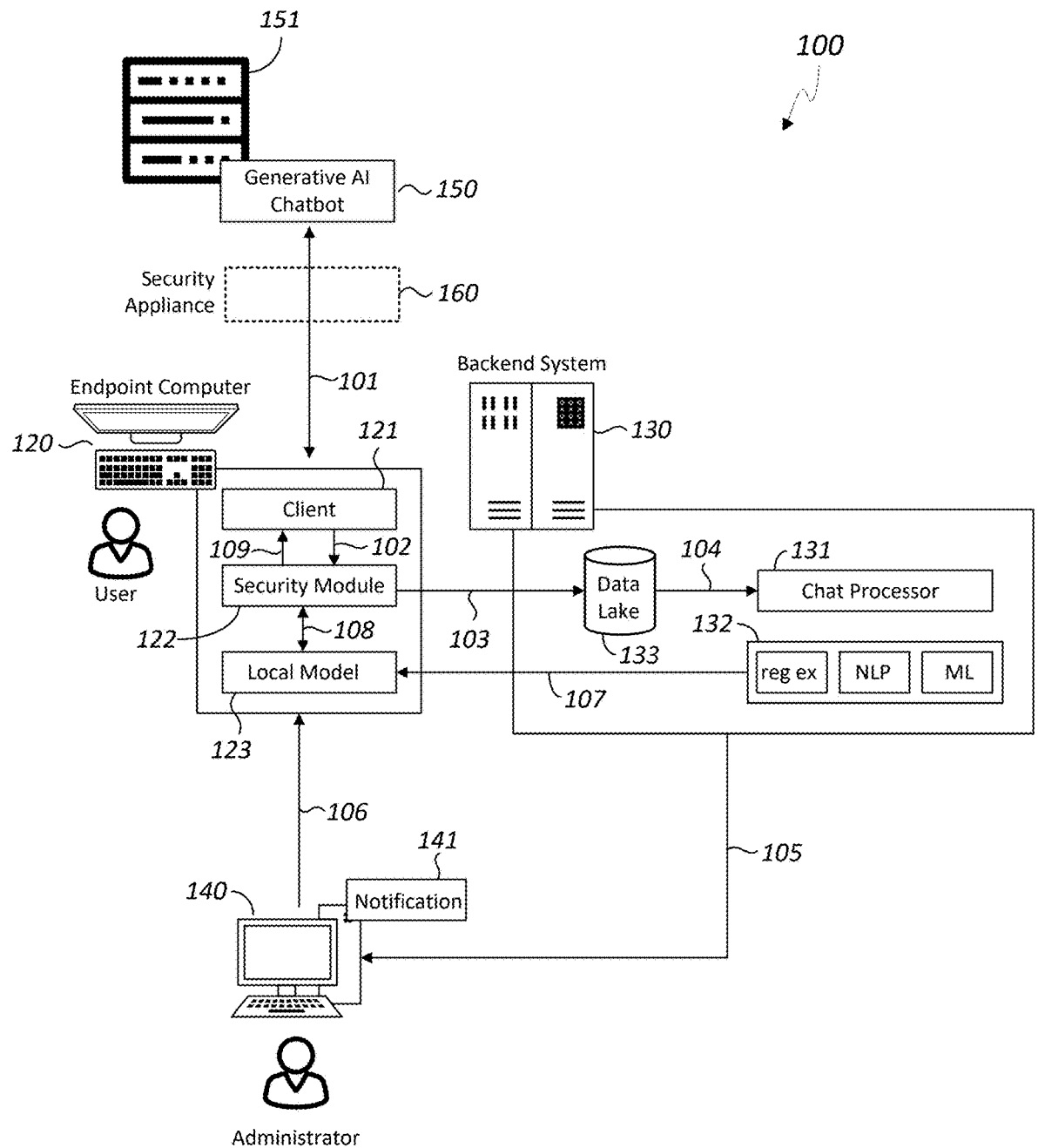
FIG. 1 shows a block diagram of a system for preventing submission of sensitive information of an enterprise to a generative artificial intelligence (AI) chatbot, in accordance with an embodiment of the present invention.

FIG. 1 shows a block diagram of a system 100 for preventing submission of sensitive information of an enterprise to a generative artificial intelligence (AI) chatbot, in accordance with an embodiment of the present invention. The system 100 includes an endpoint computer 120 and a backend system 130.

The endpoint computer 120 may comprise a workstation, laptop, or other computer system employed by a user to chat, i.e., converse, with a generative AI chatbot ("chatbot"). The user may be an employee or other member of an enterprise, such as a private company, educational institution, government, etc. The enterprise has a plurality of users but only one is shown in FIG. 1 for clarity of illustration.

The user may employ a client software 121, such as a web browser, to chat with a generative AI chatbot 150 over the public Internet (see arrow 101). In one embodiment, the chatbot 150 is the ChatGPT chatbot hosted by a computing infrastructure 151 of the OpenAI organization. As can be appreciated, embodiments of the present invention are equally applicable to other generative AI chatbots.

A security module 122 comprises software that runs locally on the endpoint computer 120. The security module 122 is configured to perform chat detection, i.e., monitor a chat between the user and the chatbot 150 (see arrow 102). In an embodiment where the client software 121 is a web browser, the security module 122 may comprise a browser plug-in. As can be appreciated, the security module 122 may be implemented some other way, including as a dedicated client-side security software that intercepts chats by way of a kernel driver, for example.

The security module 122 records the chat between the user and the chatbot 150, and forwards the record of the chat to a backend system 130 (see arrow 103) over the public Internet. The backend system 130 is external to the endpoint computer 120 and the computing infrastructure 151 that hosts the chatbot 150. This allows the functionality of the backend system 130 to be provided as a service to enterprises.

The backend system 130 may comprise a dedicated server computer system, a cloud computing platform (e.g., Amazon Web Services™ platform), or other computer system. The backend system 130 includes a data lake 133, which may be implemented on local storage of the backend system 130, network attached storage accessible to the backend system 130, or cloud storage of the backend system 130. Records of chats are stored in the data lake 133, for processing by a chat processor 131 (see arrow 104). As can be appreciated, the backend system 130 may receive records of chats of various users of the enterprise for processing as disclosed herein.

The chat processor 131 comprises software that runs on the backend system 130. The chat processor parses records of chats to identify sensitive information of the enterprise, such as customer data, proprietary program code, configurations, personally identifiable information (PII), tokens, credentials, secret keys, and other information that is deemed confidential by the enterprise.

The chat processor 131 may employ one or more detection modules 132 to identify sensitive information in chats. The one or more detection modules 132 employ regular expressions ("reg ex"), natural language processing (NLP), machine learning (ML), and/or other techniques for identifying types of information, which in this embodiment are sensitive information of the enterprise. The chat processor 131, using the one or more detection modules 132, may correlate previous behavior of a user, from historical records of chats in the data lake 133, to determine if the user submits sensitive information to the chatbot 150. Sensitive information may also be described in terms of regular expressions, which can be used to parse the records of chats. Labeled training data obtained from records of chats stored in the data lake 133 may be employed to train ML and NLP models to identify sensitive information of the enterprise in chats.

The backend system 130 (e.g., the chat processor 131) may raise an alert in response to detecting that the user submits sensitive information to the chatbot 150. The alert may be in the form of a notification 141 that is sent by the backend system 130 to a computer 140 that is employed by an administrator of the enterprise (see arrow 105). The administrator may be a person responsible for cybersecurity of the enterprise, such as a member of a Security Operations Center (SOC) or Information Technology (IT) department of the enterprise. The notification 141 may identify the user and the chatbot involved. In response, the administrator may terminate access of the user to the chatbot 150 (see arrow 106). For example, the administrator may configure a security appliance 160 of the enterprise to block all network traffic involving the chatbot 150 between the endpoint computer 120 and the computing infrastructure 151.

The notification 141 may be tailored for the specific needs of the enterprise for follow up responses and actions. For example, the notification 141 may recommend security awareness training for users who frequently submit sensitive information to the chatbot 150, or recommend token or credential replacement for users who accidentally submitted tokens or credentials to the chatbot 150.

In some embodiments, a local model 123 that is a lightweight version of the one or more modules 132 is provided to the endpoint computer 120 (see arrow 107). The local model 123 comprises software that runs locally on the endpoint computer 120, and may not have all the features of the one or more modules 132 to minimize the impact of the local model 123 on the processor, memory, or and/or storage of the endpoint computer 120. The security module 122 may employ the local model 123 to detect sensitive information in chats between the user and the chatbot 150. The security module 122 may block or replace sensitive information that is about to be submitted by the user to the chatbot 150. For example, the security module 122 may replace sensitive information with a non-sensitive synonym. The security module 122 may be configured to raise an alert in response to detecting that the user submits sensitive information to the chatbot 150.

Figure 2:
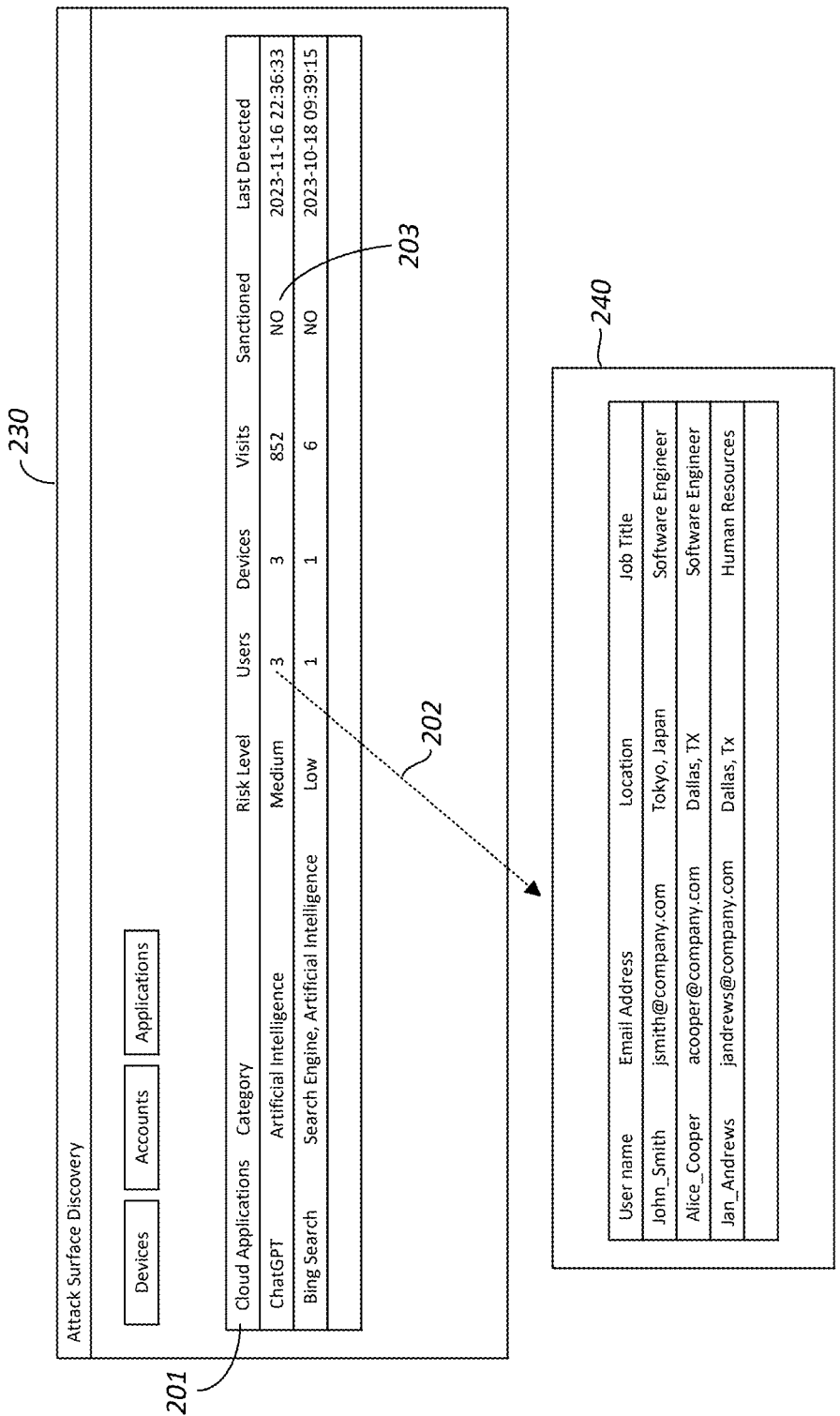
FIG. 2 shows a user interface in accordance with an embodiment of the present invention.

Chat detection and response in accordance with embodiments of the present invention may be employed to perform attack surface discovery, i.e. to identify assets of an enterprise that might be exposed to attack. FIG. 2 shows a user interface 230, in accordance with an embodiment of the present invention. The user interface 230 may be a user interface of an Extended Detection and Response ("XDR") service, such as the Trend Micro Vision One™ commercially-available from the assignee of the present application. Embodiments of the present invention may be incorporated in the Trend Micro Vision One™ service or other commercially-available XDR service.

The user interface 230 may indicate, as shown in row 201 from left to right, a cloud application, category of the cloud application, risk level of the cloud application, users of the cloud application, devices involved in the use of the cloud application, number of visits to the cloud application, whether the cloud application is sanctioned (i.e., blocked by the XDR service), and a timestamp of the last visit to the cloud application. In the example of FIG. 2, a chatbot is under the artificial intelligence category. Selecting (e.g., by a mouse click) users on the user interface 230 brings up a window 240 (see arrow 202) that lists users that are currently chatting with the chatbot. The XDR service includes an option to sanction access to the chatbot (see FIG. 2, 203), such as when a user is detected to be disclosing sensitive information to the chatbot. For example, the security appliance 160 may block all network traffic going to or from the chatbot 150 when the chatbot 150 is sanctioned.

Figure 3:
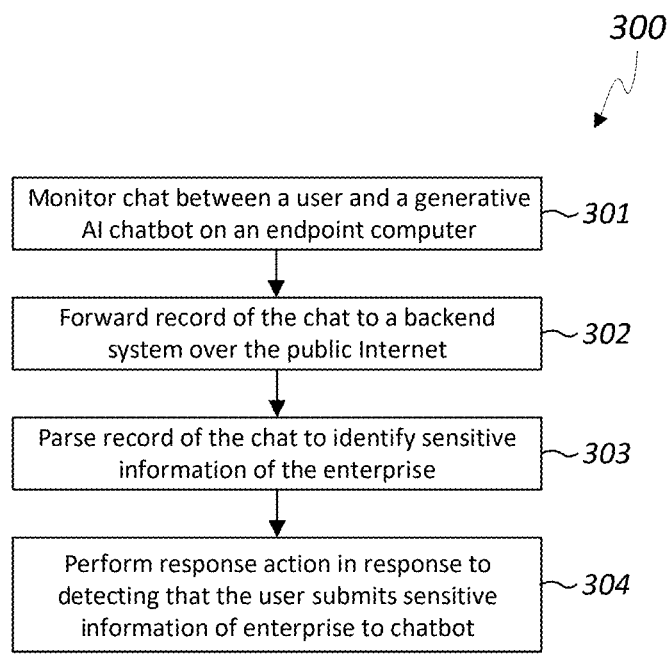
FIG. 3 shows a flow diagram of a method of preventing submission of sensitive information of an enterprise to a chatbot, in accordance with an embodiment of the present invention.

FIG. 3 shows a flow diagram of a method 300 of preventing submission of sensitive information of an enterprise to a chatbot, in accordance with an embodiment of the present invention.

In step 301, a chat between a user and a chatbot is monitored on an endpoint computer employed by the user to communicate with the chatbot over the public Internet. The user is one of a plurality of users of an enterprise. The chat is recorded on the endpoint computer.

In step 302, a record of the chat is forwarded from the endpoint computer to a backend system over the public Internet. The chat may be stored in a data lake of the backend system.

In step 303, on the backend system, the record of the chat is parsed to identify sensitive information of the enterprise.

In step 304, a response action is performed in response to detecting that the user submits sensitive information of the enterprise to the chatbot. The response action may include sending a notification to an administrator of the enterprise regarding the forwarding of sensitive information to the chatbot. The response action may also include blocking the user from accessing the chatbot, such as by blocking network traffic to or from the chatbot.

Figure 4:
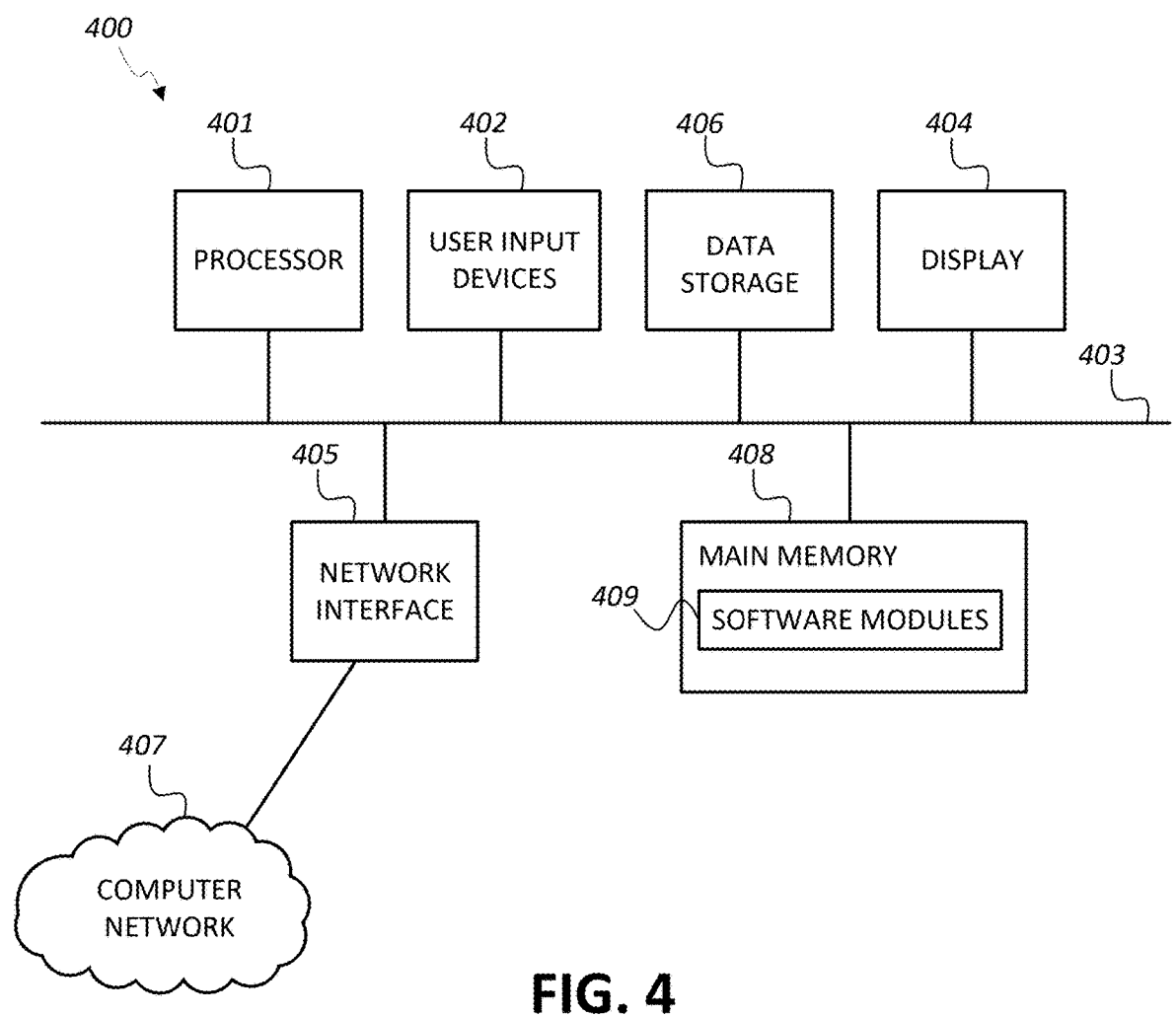
FIG. 4 shows a block diagram of a computer system that may be employed with embodiments of the present invention.

FIG. 4 shows a block diagram of a computer system 400 that may be employed with embodiments of the present invention. The computer system 400 may have fewer or more components to meet the needs of a particular cybersecurity application. The computer system 400 may include one or more processors 401. The computer system 400 may have one or more buses 403 coupling its various components. The computer system 400 may include one or more user input devices 402 (e.g., keyboard, mouse), one or more data storage devices 406 (e.g., hard drive, optical disk, solid state drive), a display screen 404 (e.g., liquid crystal display, flat panel monitor), a computer network interface 405 (e.g., network adapter, modem), and a main memory 408 (e.g., random access memory). The computer network interface 405 may be coupled to a computer network 407, which in this example includes the Internet.

The computer system 400 is a particular machine as programmed with one or more software modules 409, comprising instructions stored non-transitory in the main memory 408 for execution by at least one processor 401 to cause the computer system 400 to perform corresponding programmed steps. An article of manufacture may be embodied as computer-readable storage medium including instructions that when executed by at least one processor 401 cause the computer system 400 to be operable to perform the functions of the one or more software modules 409.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of preventing submission of sensitive information of an enterprise to a generative artificial intelligence (AI) chatbot, the method comprising:
    monitoring, on an endpoint computer, a chat between a user of a plurality of users of the enterprise and the generative AI chatbot;
    providing a record of the chat to a backend system over the public Internet, the backend system being external to the endpoint computer and external to a computing infrastructure that hosts the generative AI chatbot;
    parsing the record of the chat to identify the sensitive information of the enterprise, the sensitive information including tokens or credentials; and
    performing a response action in response to identifying a token or credential in the record of the chat, the response action including recommending token or credential replacement for the user.

2. The method of claim 1, wherein the response action includes sending a notification to an administrator of the enterprise.

3. The method of claim 2, wherein the notification includes a recommendation to provide security awareness training to the user.

4. The method of claim 1, wherein the response action includes preventing the user from using the generative AI chatbot.

5. The method of claim 1, wherein parsing the record of the chat includes using a machine learning model to identify the sensitive information of the enterprise.

6. The method of claim 1, wherein providing the record of the chat to the backend system over the public Internet includes storing the record in a data lake.

7. A system for preventing submission of sensitive information of an enterprise to a generative artificial intelligence (AI) chatbot, the system comprising:
    an endpoint computer that is employed by a user to chat with the generative AI chatbot over the public Internet; and
    a backend system comprising at least one processor and a memory, the backend system being external to the endpoint computer and external to a computing infrastructure that hosts the generative AI chatbot, the memory of the backend system storing instructions that when executed by the at least one processor of the backend system cause the backend system to:
        receive a record of the chat from the endpoint computer over the public Internet;
        parse the record of the chat to identify the sensitive information of the enterprise, the sensitive information including tokens or credentials; and
        perform a response action responsive to identifying a token or credential in the record of the chat, the response action including recommending token or credential replacement for the user.

8. The system of claim 7, wherein the record of the chat is stored in a data lake.

9. The system of claim 7, wherein the response action includes sending a notification to an administrator of the enterprise.

* * * * *